3,070,496
Patented Dec. 25, 1962

3,070,496
COMPOSITIONS AND METHODS FOR TREATMENT OF BITTERWEED POISONING IN LIVESTOCK
Ruby M. James, Jr., Ozona, Tex., assignor, by direct and mesne assignments, to Bitterx Incorporated, San Angelo, Tex., a corporation of Texas
No Drawing. Filed Sept. 12, 1960, Ser. No. 55,150
10 Claims. (Cl. 167—53)

This invention relates to new and useful improvements in compositions and methods for treatment of bitterweed poisoning in livestock.

Bitterweed, *Hymenoxys odorato* (*Actinea odorato*), is member of the composite family. It is an annual and a usually many-branched plant that varies in height from a few inches to about two feet depending on its environment of growth. Most growth takes place from early spring to early or mid-summer but may under some conditions commerce as early as December. The plant has a bitter taste that seemingly is strongest in mature plants and in plants growing in dry sites. Pingues (*Actinea richardsoni*) is another poisonous plant of the same genus which occurs in the States of Colorado, Arizona, and New Mexico. In general, bitterweed is found in appreciable growth from the central portion of the State of Texas westward to the State of California, and from the State of Kansas southward into the Republic of Mexico. Most commonly, bitterweed growths are to be found in flooded sites, drainage areas, lake beds, roadways and watering places. The growth also occurs extensively in over-grazed pastures and in heavily trampled and disturbed ground areas.

The poisoning of sheep by bitterweed has created a severe problem although some cattle losses have also been attributed to bitterweed poisoning. Most poisoning of sheep takes place in winter and early spring, and before normal green range forage is available. Experimental feedings have shown that the bitterweed plant is much more toxic during dry or drought years than when grown under conditions of near normal rainfall, but marked variation has been observed in the quantity of bitterweed necessary to kill an animal. At present, the minimum lethal dose of green, immature bitterweed for a grown sheep is considered approximately 500 grams, or about one pound, when eaten in as short a period of time as two days.

In sheep, consumption of appreciable quantities of bitterweed causes loss of appetite, cessation of rumination, depression, indication of abdominal pain, bloating, and green regurgitated material about the mouth and nose. The most constant post-mortem lesion observed is congestion in the lungs, the next most consistent lesion observed being the presence of hemorrhages on the epicardium, which in a few cases have also been observed as hemorrhages of the endocardium and of the costel plurea. The lymph nodes, especially the sub-maxillary, and retropharyngeal, also very often are markedly hemorrhagic or congestive. The fourth "stomach" is perhaps the most severely affected of the entire intestinal tract, and in the majority of cases the lesions at this point consist of a congestion or even of hemorrhages. Similar lesions also may be found scattered throughout the intestinal tract and are especially frequent in the duodenum.

Up to the present time there has been no known medical cure for severely poisoned animals, the only available treatment being the moving of the animals to pastures which are free of bitterweed, or putting the animals entirely on supplemental feeding. When the animal has consumed relatively small quantities of the bitterweed, moving to a clean pasture will usually result in a cure, but this is not true of severely poisoned animals.

The present invention is directed to the providing of an effective, reliable, and adequate medical cure for lightly poisoned animals and for the majority of animals heavily or severely poisoned by the consumption of bitterweed or closely related poisonous plant growths.

It is a principal object of this invention to provide improved compositions and methods for the treatment of bitterweed poisoning in livestock which are inexpensive in use, which are effective either for preventive purposes or for curative purposes, and which are easily incorporated into supplemental feeds so as to be taken by the animals voluntarily and with a minimum of difficulty and expense.

A further object of the invention is to provide improved compositions and methods of the character described, by means of which the effects of bitterweed poisoning are offset, elimination of the harmful components is accelerated, and damaged or adversely affected tissues are soothed and eased.

An additional object of the invention is to provide improved compositions and methods of the character described by means of which medication may be applied in varying degrees depending upon the age of the animal, the degree of sickness from bitterweed consumption, and whether preventive or curative results are desired.

In formulating the medicinal composition, the following ingredients are utilized in the range of weights indicated for formulating a single daily dose of the composition for one sheep:

Sodium bicarbonate_____ ¼ to 1½ oz.
Magnesium sulfate heptahydrate___ ⅛₆ to 1 oz.
Sulfur_____ ¹⁄₆₄ to ½ oz.
Iodine (tincture of iodine, 7%
  solution)_____ ¾ to 3 drops.
Sodium chloride (common salt)___ To palate of animal.

The above ranges of weights or percentages extend upwardly from the minimum quantities of the several ingredients found sufficient to have any beneficial effect, lesser amounts, while being harmless to the animal, being insufficient for obtaining the desired results. The maximum weights given above are those that should not be exceeded by reason of possible harm to the animal being treated.

The salt may be omitted entirely, but it has been found that the animal requires additional quantities of salt during medication, and that the salt adds to the attractiveness of the medication, when incorporated into the feed, so as readily to be consumed by nearly all sheep and other livestock.

As an example of a formulation meeting the above minimum requirements and suitable for mixing with 2000 pounds of suitable feed which may be of any usual and ordinary type as commonly fed to the animals under treatment, the following formulation steps may be employed:

Step 1: Mix 125 pounds of sodium bicarbonate with 31½ pound of magnesium sulfate heptahydrate (Epsom salts);

Step 2: Mix 2¼ ounces of 7% tincture of iodine with 4 pounds of sodium bicarbonate and mix thoroughly;

Step 3: Add 8 pounds of sulfur to the mixture of Step 1;

Step 4: Combine mixture of Step 2 with mixture of Step 3 and mix thoroughly;

Step 5: Thoroughly mix results of Step 4 with 2000 pounds of feed.

The salt may be added in those quantities normally employed for feeding to the animals being treated, and may be added at any time, preferably shortly before the feed is to be used. Over prolonged storage periods, the deliquescent nature of salt may cause some difficulties if the salt is added a considerable period of time before the feed is to be utilized, and consequently, the salt should not be added more than a few days before the medicated feed is to be employed.

In general, the medicinal composition should contain

50–80% sodium bicarbonate, 15–40% magnesium sulfate heptahydrate, 4–20% sulfur, a trace of iodine, and sodium chloride in sufficient quantities to appeal to the animal and meet its salt requirements. This mixture may be modified in accordance with the minimum and maximum dosages above recited, to include 50–76.5% sodium bicarbonate, 18.7–33.3% magnesium sulfate heptahydrate, 4.8–16.7% sulfur, salt, and a trace of iodine. Specifically, in accordance with the formulation for incorporation with 2000 pounds of dry feed, the mixture may contain 76.5% sodium bicarbonate, 18.7% magnesium sulfate heptahydrate, 4.8% sulfur, salt, and a trace of iodine.

A medicated feed prepared as set forth above may be employed for sheep grazing on ranges infested with bitterweed, the sheep receiving most desirably a minimum of ¼ pound of the feed daily or nearly daily. The sheep may safely consume from ¼ to one pound or more of the feed daily without adverse effects, but the maximum dosage per day must be kept in mind.

Thus, by mixing the medicinal composition with conventional feed, each animal will receive almost daily the minimum dosage recited hereinabove, or anywhere to three or four times as much dosage as the minimum dosage. This, however, will still be less than the maximum permissible dosage unless the animal consumes inordinate amounts of feed, at which point, the maximum dosage might be approached. This procedure of mixing the medicated feed and supplying it to the animals in the usual fashion relieves the rancher of the burden of attempting to mix individual dosages with varying quantities of feed for treatment of individual sheep. It is not necessary nor is it likely that the rancher will feed his sheep each and every day, but the medicated feed can be applied by the rancher when and as he feels that the sheep are suffering from bitterweed poisoning. It is adequate if the medicated feed is applied to the sheep even after they have become poisoned by bitterweed, and where the bitter weed infestation is heavy, medicated feed in the minimum dosage content can be fed throughout the bitterweed season with excellent effect.

In some instances, where an animal is severely poisoned, individual treatment may be indicated and this can be done by the procedure known as "drenching." In this process, some 3 ounces of the medicinal composition can be mixed with water and this dosage forced down the throat of the sheep, or any animal, with a drench gun or syringe. In some instances, animals become too sick to eat even the supplementary feed, and in these cases, treatment by drenching may be advisable.

As noted above, the medication may be utilized either as a preventive or as a curative measure, but the medicine should desirably be given to the animals before any of them become critically ill from the consumption of bitterweed. Utilizing controlled medicated feeding on the range has many advantages such as convenience and reduced labor costs, plus which the animals do not have to be penned or otherwise handled excessively.

In one instance, a ton of 20% protein cubes was mixed with the medicinal composition and fed to sheep that had been receiving corn as a supplementary feeding. The medicated material was fed at the rate of ½ pound per animal per day, and after feeding at this rate for approximately 21 days the animals which had been showing signs of bitterweed poisoning were taken off the medicated feed and put back on corn at which time all the sheep were well and no death losses occurred. Approximately 12 days after the medicated feed had been withdrawn, the sheep were again showing signs of bitterweed poisoning, and they were again put on medicated feed while pastured with heavy infestation of bitterweed for the remainder of the season. All 800 head of these sheep did very well and there were no death losses due to bitterweed poisoning.

At the same time, a group of sheep in an adjoining pasture were all showing signs of bitterweed poisoning and were very sick. The were fed ½ pound per day per head of the medicated feed and after several days the dosage was reduced to ¼ pound per head per day. These sheep were not penned at any time but were grazing in a pasture well infested with bitterweed. They were kept on the medicated feed during the remainder of the bitterweed season, and they all did well and suffered no death losses due to bitterweed poisoning.

Another group of 600 sheep had been very sick from bitterweed poisoning, and they were penned and fed on the medicated 20% protein cubes with a supplement of alfalfa hay. When they had recovered from the effects of the bitterweed, they were turned into a pasture well infested with bitterweed and fed ¼ pound per head per day of the medicated feed. They were kept on the medicated feed for the remainder of the bitterweed season without sickness and without death loss.

In another instance, a group of 150 head of bred ewes which were very sick from bitterweed grazing were penned and fed a mixture of meal and salt (4 to 1) with medication added during the day of feeding. After feeding these sheep in the pen for 3 days they showed a rapid recovery and were in fair condition. These sheep were then put into a large trap infested with bitterweed and continued on the medicated feed. After 6 days the sheep were in good condition and were put back into the pasture with only one resulting death loss.

Another group of 61 extremely sick sheep were divided, and 30 head put in one trap and 31 head in another trap. These traps were side by side with the same infestation of bitterweed. The 30 sheep were fed a mixture of metal and salt with medication added during the day of feeding, and 29 of these sheep showed a remarkable recovery in 4 to 6 days. One sheep continued to be extremely sick, but it was found that this particular sheep would not eat the feed. This is a peculiarity occasionally found in sheep and this animal finally died. The remaining 29 sheep were returned to pasture in good health.

The group of 31 sheep were fed a mixture of 4 to 1 meal and salt without medication. After 4 to 6 days, four of these sheep were dead. One ewe had lost her lamb, and the remaining animals were in poor to fair condition.

Autopsies performed on the sheep that had died showed that the paunch was extremely lacking in fluids, the food was not well digested, and the fourth "stomach" showed signs of extreme ulceration. These sheep had liquid content outside the intestines which contained a strong acid, all being indicative of bitterweed poisoning.

In general, the sheep should be treated by the use of medicated feed, and this should be initiated as soon as symptoms of bitterweed poisoning appear and continued throughout the bitterweed season. The advantage of this type of treatment is that the sheep do not have to be penned but may be fed in the pasture without having to be rounded upor handled in any way. This is the most desirable way to raise sheep. The disadvantages of feeding the medicinal composition itself to the sheep, assuming that they would consume the medication in spite of its taste, are that the sheep would have to be penned and the process of penning results not only in disturbing the sheep but also in the extra cost for labor and the resulting death losses that accompany the process of penning. The one advantage of drenching sheep would be in case an animal was critically ill and could not eat. Drenching could then be used as a last remedy considering the cheap cost of the medication and the infrequency of application. Straight feeding of the medication without mixing with livestock feed has resulted in failure of most animals to consume it and no control of quantity for those animals that do consume it. The best method to apply the medication with the least cost and the most desirable results is to mix the medication with either meal or cubed feed, both being methods of livestock feeding widely used by ranchers.

Of course, in utilizing the medication on other animals, such as cattle, the size and weight of the animal must be considered and the daily dosage accordingly increased or decreased. The predetermined minimum daily dosage should be incorporated in the quantity of dry feed supplied for each animal.

Various alterations in the ingredients and the proportions thereof may be made within the scope of the appended claims without departure from the spirit of the invention.

What I claim and desire to secure by Letters Patent is:

1. A medicinal composition for the treatment of bitterweed poisoning in animals including, sodium bicarbonate, magnesium sulfate, sulfur, and iodine.

2. A medicinal composition for the treatment of bitterweed posioning in animals including, 76.5% sodium bicarbonate, 18.7% magnesium sulfate heptahydrate, 4.8% sulfur, and a trace of iodine.

3. A medicinal composition for the treatment of bitterweed poisoning in animals including, 50-80% sodium bicarbonate, 15-40% magnesium sulfate heptahydrate, 4-20% sulfur, and a trace of iodine.

4. A medicinal composition for the treatment of bitterweed poisoning in animals including, 50-76.5% sodium bicarbonate, 18.7-33.3% magnesium sulfate heptahydrate, 4.8-16.7% sulfur, and a trace of iodine.

5. A medicinal composition for the treatment of bitterweed poisoning in animals including, sodium bicarbonate, magnesium sulfate, sulfur, iodine, and sodium chloride.

6. A medicinal composition for the treatment of bitterweed poisoning in animals including, 50-80% sodium bicarbonate, 15-40% magnesium sulfate heptahydrate, 4-20% sulfur, a trace of iodine, and sodium chloride.

7. The method of treating animals for bitterweed poisoning including, administering a mixture of sodium bicarbonate, magnesium sulfate, sulfur, and iodine admixed with a dry feed.

8. The method of treating sheep for bitterweed poisoning including, administering per animal per day a mixture containing ¼-1½ ounces sodium bicarbonate, $\frac{1}{16}$-1 ounce magnesium sulfate heptahydrate, $\frac{1}{64}$-½ ounce sulfur, and iodine equivalent to ¾-3 drops of 7% tincture of iodine, all admixed in at least ¼ pound of dry feed.

9. The method of treating sheep for bitterweed poisoning including, administering per animal per day a mixture containing ¼ to 1½ ounces sodium bicarbonate, $\frac{1}{16}$ to 1 ounce magnesium sulfate heptahydrate, $\frac{1}{64}$-½ ounce sulfur, sodium chloride, and iodine equivalent to ¾-3 drops of 7% tincture of iodine, all admixed in at least ¼ pound of dry feed.

10. The method of treating animals for bitterweed poisoning including, administering daily a mixture of sodium bicarbonate, magnesium sulfate, sulfur, sodium chloride, and iodine admixed with a dry feed.

References Cited in the file of this patent

Remington's Practice of Pharmacy, 11th Edition, 1956, The Mack Pub. Co., Easton, Pa., pages 1583 and 1589.

U.S. Dispensatory, 24th Edition, 1947, pages 1165 and 1166.